United States Patent

Yuan et al.

(10) Patent No.: US 10,330,783 B1
(45) Date of Patent: Jun. 25, 2019

(54) LOCATION SERVICE OFFLOAD FOR BLUETOOTH POSITIONING

(71) Applicant: Marvell International Ltd., Hamilton (BM)

(72) Inventors: Quinton Yuan, Fremont, CA (US); Frank Huang, Dublin, CA (US)

(73) Assignee: Marvell International Ltd., Hamilton (BM)

( * ) Notice: Subject to any disclaimer, the term of this patent is extended or adjusted under 35 U.S.C. 154(b) by 43 days.

(21) Appl. No.: 15/703,898

(22) Filed: Sep. 13, 2017

Related U.S. Application Data (60) Provisional application No. 62/396,477, filed on Sep. 19, 2016.

(51) Int. Cl.
| | |
|---|---|
| *G01S 11/06* | (2006.01) |
| *G01S 5/02* | (2010.01) |
| *H04W 64/00* | (2009.01) |
| *H04W 24/02* | (2009.01) |
| *H04W 48/08* | (2009.01) |

(52) U.S. Cl.
CPC ............ *G01S 11/06* (2013.01); *G01S 5/0289* (2013.01); *H04W 64/006* (2013.01); *H04W 24/02* (2013.01); *H04W 48/08* (2013.01)

(58) Field of Classification Search
CPC ..................................................... G01S 11/06
See application file for complete search history.

(56) References Cited

U.S. PATENT DOCUMENTS

| | | | | |
|---|---|---|---|---|
| 8,238,832 | B1 * | 8/2012 | Zhou ................... | H04B 7/0408 455/41.2 |
| 2011/0195701 | A1 * | 8/2011 | Cook ................... | G01S 5/0018 455/422.1 |
| 2012/0178471 | A1 * | 7/2012 | Kainulainen ........ | G01S 5/0009 455/456.1 |
| 2015/0319579 | A1 * | 11/2015 | Syrjarinne ............ | G01C 21/20 455/456.1 |
| 2017/0201859 | A1 * | 7/2017 | Banerjea ................. | H04W 4/80 |
| 2018/0074188 | A1 * | 3/2018 | Polo .......................... | G01S 5/00 |

\* cited by examiner

*Primary Examiner* — David Bilodeau (57) ABSTRACT

The present disclosure describes methods and apparatuses for location service offload for Bluetooth positioning. In some aspects a Bluetooth radio frequency (RF) signal is sampled by a Bluetooth transceiver to produce a set of samples corresponding to an advertisement packet and the set of samples are stored in a shared memory. Another transceiver is signaled that the set of samples are stored in the shared memory, causing the other transceiver to generate the Angle of Arrival (AoA) of the Bluetooth RF signal. A signal is received from the other transceiver indicating that the generated AoA is available in the shared memory. The generated AoA is read from the shared memory by the Bluetooth transceiver and sent to a host processor. By so doing, data transfer between the Bluetooth transceiver and the host processor is reduced, as well as, reducing the computational load on the host processor.

18 Claims, 4 Drawing Sheets

LOCATION SERVICE OFFLOAD FOR BLUETOOTH POSITIONING

CROSS REFERENCE TO RELATED APPLICATION

This present disclosure claims priority to U.S. Provisional Patent Application Ser. No. 62/396,477 filed Sep. 19, 2016, the disclosure of which is incorporated by reference herein in its entirety.

BACKGROUND

Low-power radio beacons, such as Bluetooth Low Energy (BLE) beacons, transmit information that is used by an application on a mobile device to provide location-relevant and/or context relevant information to a user. BLE beacons can also be used as tags for asset tracking of portable or mobile assets. Whether a computing device is a mobile device that is determining its location relative to a fixed BLE beacon or the computing device is an asset tracking device that is determining the location of a BLE tag, a Bluetooth transceiver in the computing device receives a Bluetooth radio frequency (RF) signal from the beacon and samples the Bluetooth RF signal to produce sample data that is used to calculate an Angle of Arrival (AoA) of the received Bluetooth RF signal. The Bluetooth transceiver provides the sample data to a location service executing on a host processor in the computing device, which uses the data to calculate the AoA of the Bluetooth RF signal relative to the computing device. Applications executing on the computing device use the generated AoA as part of location or positioning algorithms, such as triangulation, to calculate the location of the mobile device or a tagged asset.

Typically, a Bluetooth transceiver has limited computational capabilities that are sufficient for performing Bluetooth operations, including sampling the Bluetooth RF signal to provide data for the AoA generation, but are insufficient to perform the AoA generation while providing timely positioning updates to consuming applications on the computing device. The AoA calculation is performed more quickly using the greater computational capabilities of the host processor of the computing device. However, for each AoA that is generated by the location service on the host processor, a set of AoA sample data is transferred across an interface between the Bluetooth transceiver and the host processor. As applications use increasing numbers of beacon signals to accurately triangulate location, the increasing transfer of samples for AoA generation can tax the throughput of the interface between the Bluetooth transceiver and the host processor. This throughput limitation can affect the performance of positioning and location-based applications executing on the host processor and can affect the responsiveness a user experiences for positioning updates on a mobile device.

SUMMARY

This summary is provided to introduce subject matter that is further described in the Detailed Description and Drawings. Accordingly, this Summary should not be considered to describe essential features nor used to limit the scope of the claimed subject matter.

In some aspects, a method of generating an angle of arrival (AoA) by a radio transceiver is described that extracts a set of samples from digitized samples of a Bluetooth radio frequency (RF) signal and stores the set of samples in a shared memory. Another processor is signaled that the set of samples are stored in the shared memory, causing the other processor to generate the AoA of the Bluetooth RF signal. A signal is received from the other processor indicating that the generated AoA is available in the shared memory. The generated AoA is read from the shared memory and sent to a host processor.

In other aspects, an apparatus for wireless communication is described that includes a Wi-Fi transceiver, a Bluetooth transceiver, and a shared memory connected to the Wi-Fi transceiver and to the Bluetooth transceiver. The Bluetooth transceiver is configured to extract a set of samples from digitized samples of a Bluetooth radio frequency (RF) signal, store the set of samples in the shared memory, and signal the Wi-Fi transceiver to indicate the set of samples are stored in the shared memory. The Wi-Fi transceiver is configured to retrieve the set of samples from the shared memory, generate, using the set of samples, an angle of arrival (AoA) of the Bluetooth RF signal, store the generated AoA in the shared memory, and signal the Bluetooth transceiver to indicate that the generated AoA is available in the shared memory.

In yet other aspects, a System-on-Chip (SoC) is described that includes a Wi-Fi transceiver, a Bluetooth transceiver, and a shared memory connected to the Wi-Fi transceiver and to the Bluetooth transceiver. The Bluetooth transceiver is configured to extract a set of samples from digitized samples of a Bluetooth radio frequency (RF) signal, store the set of samples in the shared memory, and signal the Wi-Fi transceiver to indicate the set of samples are stored in the shared memory. The Wi-Fi transceiver is configured to retrieve the set of samples from the shared memory, generate, using the set of samples, an angle of arrival (AoA) of the Bluetooth RF signal, store the generated AoA in the shared memory, and signal the Bluetooth transceiver to indicate that the generated AoA is available in the shared memory.

The details of one or more implementations are set forth in the accompanying drawings and the following description. Other features and advantages will be apparent from the description and drawings, and from the claims.

BRIEF DESCRIPTION OF THE DRAWINGS

The details of one or more implementations of location service offload for Bluetooth positioning are set forth in the accompanying figures and the detailed description below. In the figures, the left-most digit of a reference number identifies the figure in which the reference number first appears. The use of the same reference numbers in different instances in the description and the figures indicates like elements.

DETAILED DESCRIPTION

Conventional techniques that sample Angle of Arrival (AoA) data in a Bluetooth transceiver and transfer the AoA samples to a host processor for the generation of an AoA, place a throughput burden on the interface between the Bluetooth transceiver and the host processor. These throughput limitations can affect the performance of positioning and location-based applications executing on the host processor and can affect the responsiveness a user experiences for positioning updates on a mobile device.

Bluetooth radio systems are designed with relatively lower bandwidth and throughput, as compared to radio systems such as Wi-Fi, which operate in accordance with various Institute of Electronics and Electrical Engineers (IEEE) 802.11 standards that may include 802.11n, 802.11ac, 802.11ad, 802.11ax, and the like. Having relatively lower bandwidth and throughput, Bluetooth radio transceivers require fewer computational and memory resources than a Wi-Fi transceiver. Bluetooth transceivers operate in the 2.4 GHz unlicensed radio band and Wi-Fi transceivers also operate in the 2.4 GHz unlicensed radio band, as well as other frequencies.

Because of the overlapping operation in the 2.4 GHz band, Bluetooth and Wi-Fi transceivers often share radio components, such as antennas and RF front end circuitry, especially in mobile devices where space is limited and Bluetooth and Wi-Fi radio operations must coexist without interfering with each other. These commonalities lead to designing Bluetooth and Wi-Fi transceivers into a common radio module and/or System-on Chip (SoC).

This disclosure describes techniques and apparatuses for location service offload for Bluetooth positioning. In some aspects, AoA sample data in a Bluetooth transceiver is shared with a Wi-Fi transceiver. The Wi-Fi transceiver generates the AoA from the shared AoA sample data and provides the generated AoA to the Bluetooth transceiver. The Bluetooth transceiver provides the generated AoA to a host processor from consumption by upper layer services and applications. By so doing, data transfer between the Bluetooth transceiver and the host processor is reduced for the transfer of AoA information for positioning applications. Additionally, the computational load on the host processor is reduced by offloading the AoA generation from the host processor to the processor of the Wi-Fi transceiver.

The following discussion describes an operating environment, techniques that may be employed in the operating environment, and a System-on-Chip (SoC) in which components of the operating environment can be embodied. In the context of the present disclosure, reference is made to the operating environment by way of example only.

Operating Environment

Figure 1:
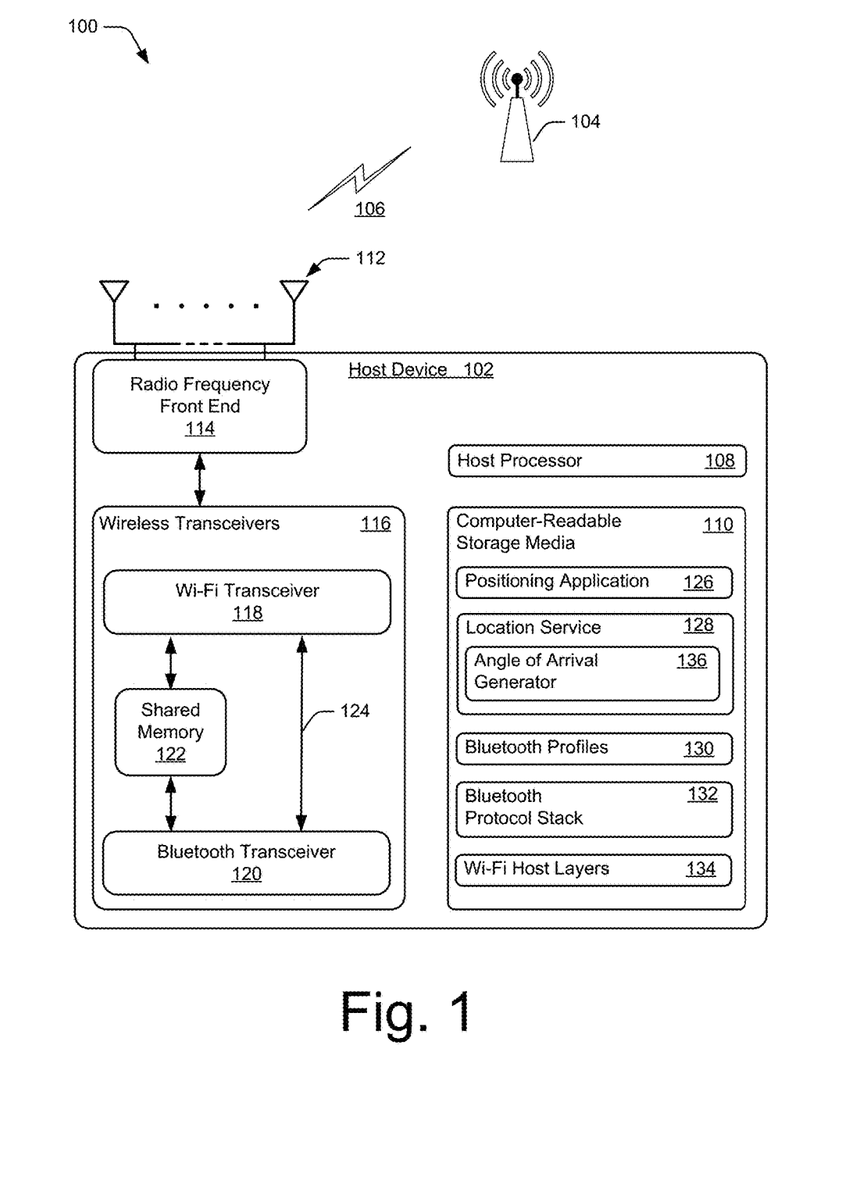
FIG. 1 illustrates an example operating environment having devices that are capable of wireless communication.

FIG. 1 illustrates an example of an operating environment 100 having a host device 102 and a beacon 104 that are capable of communicating data, packets, and/or frames over a wireless connection 106, such as a Bluetooth personal area network (PAN). The PAN may operate in accordance with various Bluetooth standards. Alternately or additionally, the wireless connection 106 or other wireless connections of the devices may be implemented as a wireless local area network (WLAN) that may operate in accordance with various Institute of Electronics and Electrical Engineers (IEEE) 802.11 standards that may include 802.11n, 802.11ac, 802.11ad, 802.11ax, and the like, a peer-to-peer network, a mesh network, or a cellular network, such as a 3rd Generation Partnership Project Long-Term Evolution (3GPP LTE) network.

In this example, the host device 102 is embodied as a mobile device, such as a smartphone, a tablet computer, and/or a laptop computer, that is capable of communicating over wireless networks that include the wireless connection 106. In other cases, the host device 102 may include or be embodied as a base station, a wireless router, an access point, a broadband router, a modem device, or another network administration device. Although not shown, other configurations of the host devices 102 are also contemplated, such as a desktop computer, a server, a wearable smart-device, a television, a mobile-internet device (MID), a network-attached-storage (NAS) drive, a mobile gaming console, and so on.

The beacon 104 is a low-power radio beacon that transmits data, packets, and/or frames that are used by the host device 102 to determining positioning information (e.g., location, proximity, and the like) for use by applications that provide location-related services, such as location-based advertisements, asset tracking, and so forth. The beacon 104 may operate according to radio standards, such as BLE, Bluetooth Smart, and the like. For example, the beacon 104 transmits BLE advertisement packets that are received and processed by the host device 102 to determine AoA information. Additionally and/or optionally the BLE advertisement packet may include Angle of Departure (AoD) information related to the beacon 104, which can be incorporated into determining positioning information by the host device 102.

The host device 102 includes a host processor 108 configured to execute processor-executable instructions and computer-readable storage media 110 (CRM 110). In some cases, the host processor 108 is implemented as an application processor or baseband processor to manage operation and connectivity of the host device 102. The CRM 110 of the host device 102 may include any suitable type and/or combination of storage media, such as read-only memory (ROM), random access memory (RAM), or Flash memory. The CRM 110 may store firmware, an operating system, or applications of the host device 102 as instructions that are executed by the host processor 108 to implement various functionalities of the host device 102.

The host device 102 also includes antennas 112, a radio frequency front end 114 (RF front end 114), and wireless transceivers 116 for communicating with the beacon 104 or communicating other with wirelessly-enabled devices. The RF front end 114 of the host device 102 can couple or connect the wireless transceivers 116 to the antennas 112 to facilitate various types of wireless communication. The antennas 112 of the host device 102 may include an array of multiple antennas that are configured similar to or differently from each other. The wireless transceivers 116 may include any suitable number of transceivers to support respective communication standards.

The wireless transceivers 116 include a Wi-Fi transceiver 118 and a Bluetooth transceiver 120, which are described in detail below, with respect to FIG. 2. A shared memory 122 is connected between the Wi-Fi transceiver 118 and the Bluetooth transceiver 120. The shared memory 122 is used to transfer AoA sample data and/or an AoA between the Wi-Fi transceiver 118 and the Bluetooth transceiver 120. The shared memory 122 may be implemented in an suitable manner, such as using a dual-ported RAM, a First-In, First-Out (FIFO) memory, and the like.

An inter-processor communication path 124 is a bidirectional communication path connected between the Wi-Fi transceiver 118 and the Bluetooth transceiver 120. The inter-processor communication path 124 is used by processors in the Wi-Fi transceiver 118 and the Bluetooth transceiver 120 to coordinate the transfer of the AoA sample data and/or the AoA result between the Wi-Fi transceiver 118 and the Bluetooth transceiver 120, as described in detail below. The inter-processor communication path 124 can be implemented using any suitable technique, such as a message queue, shared mailboxes, a socket interface, processor interrupts, and the like.

The CRM 110 may store applications, services, networking profiles, and networking layers of the host device 102, as instructions that are executed by the host processor 108 to implement various functionalities related to the wireless transceivers 116 and positioning services and applications. In this example, a positioning application 126, a location service 128, Bluetooth profiles 130, a Bluetooth protocol stack 132, and Wi-Fi host layers 134, of the host device 102 are embodied on the CRM 110. The Wi-Fi host layers 134 include applications, upper level networking layers of the Wi-Fi network stack, and drivers that connect Wi-Fi host layers 134 to the Wi-Fi transceiver 118. The implementations and uses of these entities vary, and are described throughout the disclosure.

The positioning application 126 is a user application (e.g., an asset tracking application, a location-dependent advertising application, and the like) that consumes positioning information from the location service 128. The location service 128 utilizes the Bluetooth profiles 130, the Bluetooth protocol stack 132, and the Bluetooth transceiver 120 to provide the location information to the positioning application 126. For example, in conventional techniques for Bluetooth positioning, the location service 128 includes an Angle of Arrival generator 136 (AoA generator 136) that determines the AoA of an RF signal received from the beacon 104. The AoA generator 136 determines the AoA for the RF signal received from the beacon 104 based on the AoA sample data obtained from the Bluetooth transceiver 120.

Figure 2:
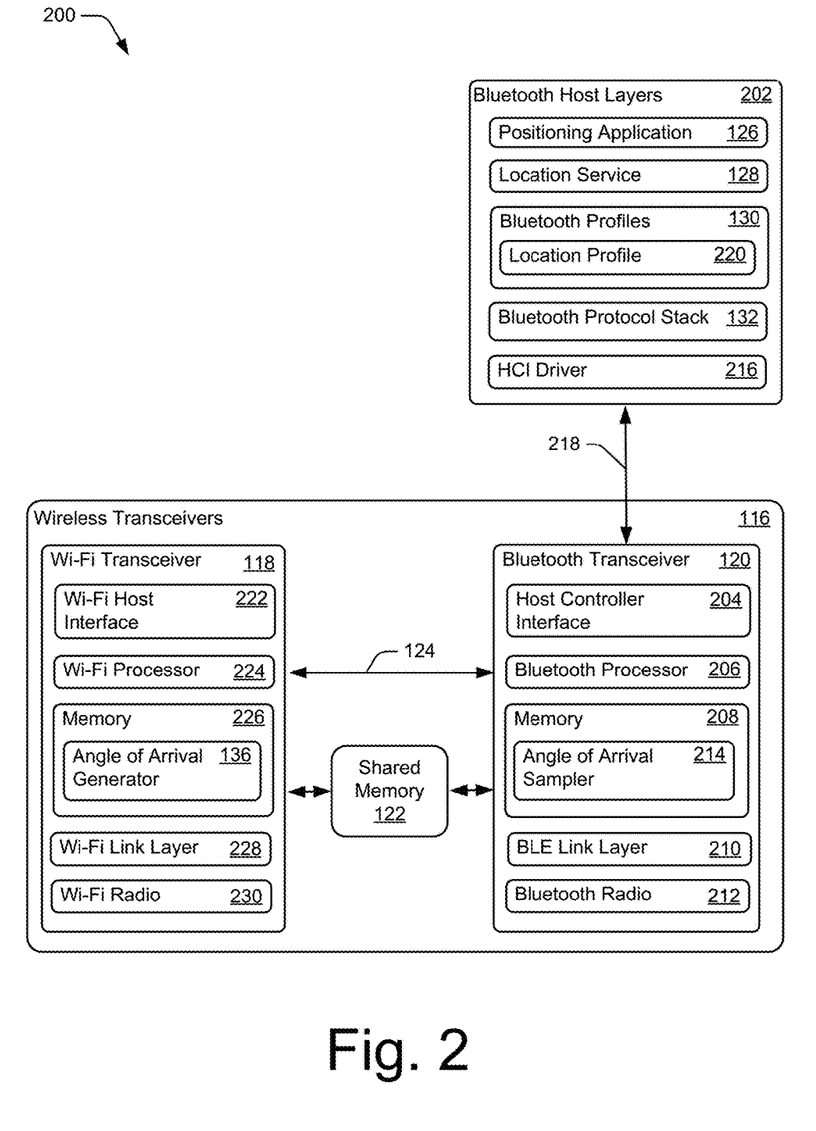
FIG. 2 illustrates example configurations of the devices of FIG. 1 that include an Angle of Arrival sampler and Angle of Arrival generator in accordance with one or more aspects.

FIG. 2 illustrates example configurations and operations of the host device 102 in accordance with one or more aspects, generally at 200. In this example, detailed aspects of the Wi-Fi transceiver 118, the Bluetooth transceiver 120, and Bluetooth host layers 202 are described.

The Bluetooth transceiver 120 includes a Host Controller Interface 204 (HCI 204), a Bluetooth processor 206, memory 208, a BLE link layer 210, and a Bluetooth radio 212. The HCI 204 provides a standardized communication interface between the Bluetooth host layers 202 and the Bluetooth transceiver 120. The Bluetooth processor 206 is configured to execute processor-executable instructions related to the operation of the Bluetooth transceiver 120, such as Bluetooth communication protocols. The memory 208 may include any suitable type and/or combination of storage media, such as read-only memory (ROM), random access memory (RAM), or Flash memory. The memory 208 may store firmware, an operating system, or applications of the Bluetooth transceiver 120 as instructions that are executed by the Bluetooth processor 206 to implement various functionalities of the Bluetooth transceiver 120. The BLE link layer 210 controls how data is transferred over a BLE link, such as controlling how data packets are encoded for transmission and received data packets are decoded. The Bluetooth radio 212 controls how physical layer radio resources are controlled for transmission and reception of Bluetooth communications. The physical layer radio resources of the Bluetooth radio 212 include radio circuitry and logic for control of the radio circuitry.

In some aspects, the memory 208 includes instructions for an Angle of Arrival sampler 214 (AoA sampler 214). The AoA sampler 214 processes digitized samples (e.g., I/Q samples) of BLE signals for one or more BLE advertisement packets received from the beacon 104 by the Bluetooth radio 212. The AoA sampler 214 provides AoA sample data used by the AoA generator 136 to determine the AoA of the radio signal carrying the advertisement packet received from the beacon 104. For example, the AoA sample data may include amplitude, phase and/or timing information (e.g., I/Q samples) for the BLE signal received at one or more antennas 112. In aspects, if multiple antennas 112 receive the BLE signal, the AoA sample data can include groups of samples, where each group of samples corresponds to the BLE signal received at a different one of the multiple antennas 112.

Additionally or optionally, location information may be encoded in the received BLE advertisement packet by the beacon 104, such as Angle of Departure (AoD) information. The AoD information indicates directional information about the signal transmitted by the beacon 104. For example, the beacon 104 may switch between multiple, directional antennas with different orientations to transmit advertisement packets. The AoD information transmitted in the BLE advertisement packet indicates the orientation of the particular antenna the beacon 104 used for transmission of the BLE advertisement packet. The AoA sampler 214 can decode the content of the received BLE advertising packet, extract the AoD information in the received BLE advertisement packet, and provide the AoD information to the AoA generator 136.

The Bluetooth host layers 202 are applications and services generally configured as elements of a network stack architecture, such as in the Open Systems Interconnect (OSI) model. The Bluetooth host layers 202 include the positioning application 126, the location services 128, the Bluetooth profiles 130, the Bluetooth protocol stack 132, and a Host Controller Interface driver 216 (HCI driver 216). The HCI driver 216 provides an interface to the HCI 204 for the Bluetooth protocol stack 132. The HCI 204 and the HCI driver 216 communicate via a data bus 218. The data bus 218 can be implemented using any suitable interconnection such as a serial interface, a parallel bus interface, a UART interface, and so forth. The Bluetooth profiles 130 include a location profile 220 that provides access to positioning-related information for higher layer services and applications.

The Wi-Fi transceiver 118 includes a Wi-Fi host interface 222, a Wi-Fi processor 224, memory 226, a Wi-Fi link layer 228, and a Wi-Fi radio 230. The Wi-Fi host interface 222 provides a communication interface between the Wi-Fi host layers 134 and the Wi-Fi transceiver 118. The Wi-Fi processor 224 is configured to execute processor-executable instructions related to the operation of the Wi-Fi transceiver 118, such as Wi-Fi communication protocols. The memory 226 may include any suitable type and/or combination of storage media, such as read-only memory (ROM), random access memory (RAM), or Flash memory. The memory 226 may store firmware, an operating system, or applications of the Wi-Fi transceiver 118 as instructions that are executed by the Wi-Fi processor 224 to implement various functionalities of the Wi-Fi transceiver 118. In aspects, the memory 226 includes instructions for the Angle of Arrival generator 136 to offload the generation of the AoA from the host processor 108 to the Wi-Fi processor 224.

The Wi-Fi link layer 228 controls how data is transferred over a Wi-Fi link, such as controlling how data packets are encoded for transmission and received data packets are decoded. The Wi-Fi radio 230 controls how physical layer radio resources are controlled for transmission and reception of Wi-Fi communications. The physical layer radio resources of the Wi-Fi radio 230 include radio circuitry and logic for control of the radio circuitry.

In aspects of locating service offload for Bluetooth positioning, the Bluetooth processor 206 transfers the AoA sample data into the shared memory 122 and notifies the Wi-Fi processor 224, via the inter-processor communication path 124, that the AoA sample data is available in the shared memory 122. The Wi-Fi processor 224 reads the AoA sample data from the shared memory 122 and generates the AoA from the retrieved AoA sample data using the angle of arrival generator 136. The Wi-Fi processor 224 stores the generated AoA result in the shared memory 122 and notifies the Bluetooth processor 206, via inter-processor communication path 124, that the AoA result is available in the shared memory 122. The Bluetooth processor 206 reads the AoA result from the shared memory 122 and sends the AoA result, via the Bluetooth host layers 202, for consumption and use by the location service 128 and the positioning application 126. This offloading of the AoA calculation to the AoA generator 136 in the Wi-Fi transceiver 118 reduces the computational load on the host processor 108 and reduces the amount of data transferred via the data bus 218 from the Bluetooth transceiver 120, via the Bluetooth host layers 202, to the host processor 108.

Additionally or optionally, if the received BLE advertisement packet includes Angle of Departure (AoD) information, the AoA sampler 214 can decode the BLE advertisement packet, extract the AoD information, and store the AoD information in the shared memory 122 for use by the AoA generator 136 and/or provide the AoD information to the location service 128 and the positioning application 126.

Techniques of Locating Service Offload for Bluetooth Positioning

The following discussion describes techniques of locating service offload for Bluetooth positioning. These techniques can be implemented using any of the environments and entities described herein, such as the Wi-Fi transceiver 118, the Bluetooth transceiver 120, the AoA generator 136, or the AoA sampler 214. These techniques include the method illustrated in FIG. 3, which is shown as a set of operations performed by one or more entities. This method is not necessarily limited to the order of operations shown. Rather, any of the operations may be repeated, skipped, substituted, or re-ordered to implement various aspects described herein. Further, this method may be used in whole or in part, whether performed by the same entity, separate entities, or any combination thereof. In portions of the following discussion, reference will be made to operating environment 100 of FIG. 1 and entities of FIG. 2 by way of example. Such reference is not to be taken as limiting described aspects to operating environment 100 but rather as illustrative of one of a variety of examples.

Figure 3:
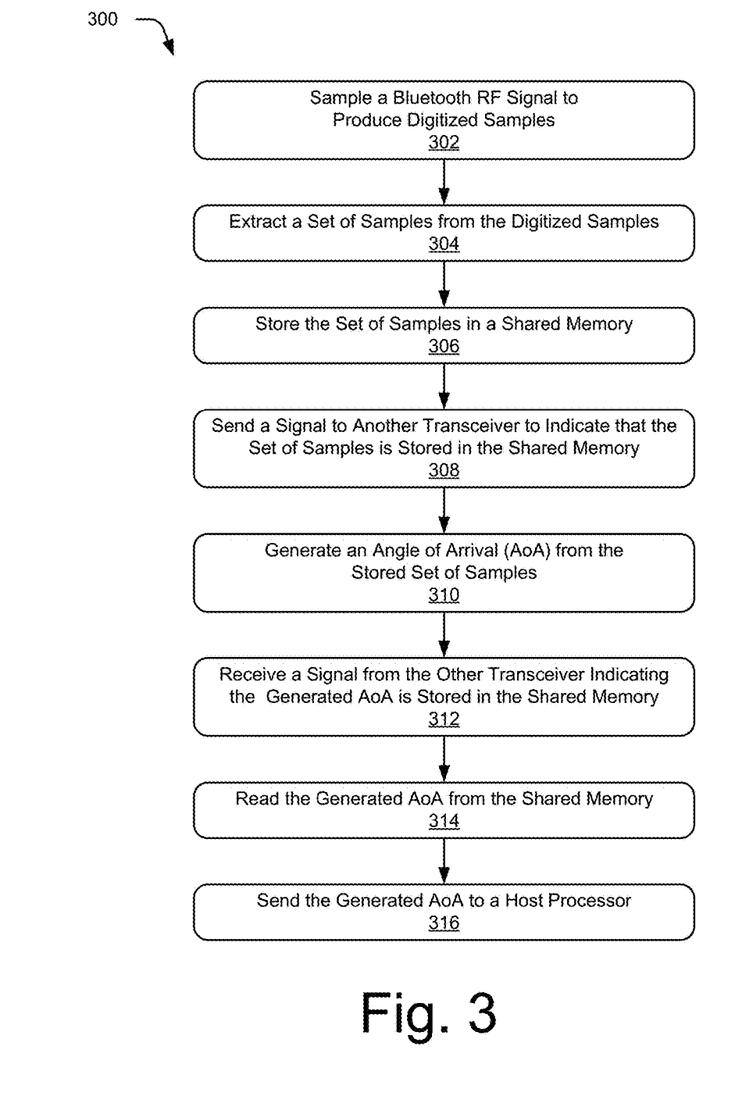
FIG. 3 depicts an example method for location service offload for Bluetooth positioning.

FIG. 3 depicts an example method 300 for locating service offload for Bluetooth positioning, including operations performed by the AoA generator 136 or AoA sampler 214.

At 302, a radio transceiver samples a Bluetooth RF signal to produce digitized samples of the Bluetooth RF signal. For example, the Bluetooth radio 212 digitally samples a Bluetooth RF signal received via the RF front end 114, from the antennas 112.

At 304, a set of samples for generating an AoA are extracted from the digitized samples of the Bluetooth RF signal. For example, the AoA sampler 214 extracts AoA sample data for a BLE advertisement packet from the digital samples of the Bluetooth RF signal.

At 306, the radio transceiver stores the set of samples in a shared memory. For example, the Bluetooth transceiver 120 stores the AoA sample data in the shared memory 122.

At 308, the radio transceiver sends a signal to another transceiver to indicate that the set of samples is stored in the shared memory, and at 310 the other transceiver generates an AoA from the stored set of samples. For example, the Bluetooth processor 206 signals the Wi-Fi processor 224 in the Wi-Fi transceiver 118 that the AoA sample data is stored in the shared memory 122. The Wi-Fi processor 224 reads the AoA sample data from the shared memory 122, generates an AoA from the set of samples, and stores the generated AoA in the shared memory 122.

At 312, the radio transceiver receives a signal indicating that the other processor has stored a generated AoA in the shared memory. For example, the Wi-Fi processor 224 signals the Bluetooth processor 206 that the Wi-Fi processor 224 has stored a generated AoA in the shared memory 122.

At 314, the radio transceiver reads the generated AoA from the shared memory. For example, the Bluetooth processor 206 reads the generated AoA from the shared memory 122.

At 316, the radio transceiver sends the generated AoA to a host processor. For example, the Bluetooth transceiver 120 sends the generated AoA, via the HCI 204 and data bus 218 to the location service 128 that is executing on the host processor 108 of the host device 102.

System-on-Chip

Figure 4:
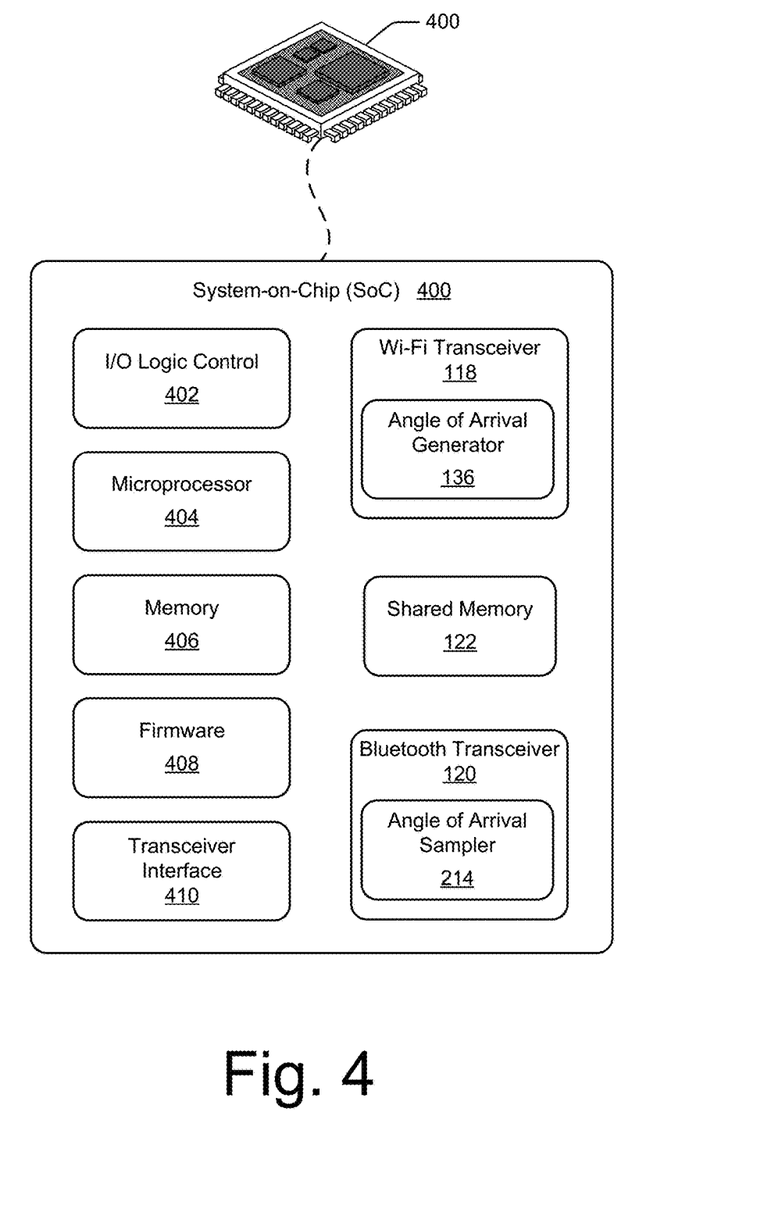
FIG. 4 illustrates an example System-on-Chip (SoC) environment for implementing aspects of location service offload for Bluetooth positioning.

FIG. 4 illustrates an exemplary System-on-Chip (SoC) 400 that can implement various aspects of locating service offload for Bluetooth positioning. The SoC 400 can be implemented in any suitable device, such as a smart-phone, cellular phone, netbook, tablet computer, access point, wireless router, network-attached storage, camera, smart appliance, printer, a set-top box, or any other suitable type of device. Although described with reference to a SoC, the entities of FIG. 4 may also be implemented as an application-specific integrated-circuit (ASIC), chip set, communications controller, application-specific standard product (ASSP), digital signal processor (DSP), programmable SoC (PSoC), system-in-package (SiP), or field-programmable gate array (FPGA).

The SoC 400 can be integrated with electronic circuitry, a microprocessor, memory, input-output (I/O) logic control, communication interfaces, other hardware, firmware, and/or software useful to provide functionalities of a device, such as any of the devices listed herein. The SoC 400 can also include an integrated data bus (not shown) that couples the various components of the SoC for data communication between the components. The integrated data bus or other components of the SoC 400 may be exposed or accessed through an external port, such as a JTAG port. For example, components the SoC 400 may be configured or programmed (e.g., flashed) through the external port at different stages of manufacture, provisioning, or deployment.

In this example, the SoC 400 includes various components such as input-output (I/O) logic control 402 (e.g., to include electronic circuitry) and a microprocessor 404 (e.g., any of a microcontroller, processor core, application processor, or DSP). The SoC 400 also includes memory 406, which can be any type and/or combination of RAM, SRAM, DRAM, non-volatile memory, ROM, one-time programmable (OTP) memory, multiple-time programmable (MTP) memory, Flash memory, and/or other suitable electronic data storage. In the context of this disclosure, the memory 406 stores data, instructions, or other information via non-transitory signals, and does not include carrier waves or other transitory signals.

Alternately or additionally, SoC 400 may comprise a data interface (not shown) for accessing additional or expandable off-chip memory, such as external SRAM or Flash memory. SoC 400 may also include various applications, operating systems, software, and/or firmware, which can be embodied as processor-executable instructions maintained by memory 406 and executed by microprocessor 404. The SoC 400 may also include other communication interfaces, such as a transceiver interface 410 for controlling or communicating with components of a local or off-chip wireless transceiver.

The SoC 400 also includes a Wi-Fi transceiver 118, a Bluetooth transceiver 120, a shared memory 122, an AoA generator 136, and an AoA sampler 214, which may be embodied as disparate or combined components, as described in relation to aspects presented herein. Examples of these components and/or entities, and their corresponding functionality, are described with reference to the respective components of the environment 100 shown in FIG. 1 and the example device configuration shown in FIG. 2. The AoA generator 136, and the AoA sampler 214, either in whole or part, can be implemented as processor-executable instructions maintained by the memory 406 and executed by the microprocessor 404 to implement various aspects and/or features described herein.

The AoA generator 136 or the AoA sampler 214, either independently or in combination with other entities, can be implemented with any suitable combination of components or circuitry to implement aspects described herein. For example, the AoA generator 136 or the AoA sampler 214 may be implemented as part of a digital signal processor, arithmetic logic unit (ALU), matrix decomposer, and the like. The AoA generator 136 or the AoA sampler 214 may also be provided integral with other entities of SoC 400, such as integrated with the microprocessor 404, a graphic processing unit, signal processing block, or vector processing block within the SoC 400. Alternately or additionally, the AoA generator 136 or the AoA sampler 214 and other components can be implemented as hardware, firmware, fixed logic circuitry, or any combination thereof.

Although the subject matter has been described in language specific to structural features and/or methodological operations, it is to be understood that the subject matter defined in the appended claims is not necessarily limited to the specific features or operations described herein, including orders in which they are performed.

What is claimed is:

1. A method of generating an angle of arrival (AoA) by a radio transceiver of a device, the method comprising:
    extracting, by the radio transceiver, a set of samples from digitized samples of a Bluetooth radio frequency (RF) signal;
    storing, by the radio transceiver, the set of samples in a memory of the device, wherein the memory is shared between the radio transceiver and a Wi-Fi transceiver of the device;
    signaling, by the radio transceiver, the Wi-Fi transceiver that the set of samples is stored in the memory, the signaling being effective to cause the Wi-Fi transceiver to generate the AoA of the Bluetooth RF signal;
    receiving, by the radio transceiver and from the Wi-Fi transceiver, a signal indicating that the generated AoA is available in the memory;
    reading, by the radio transceiver, the generated AoA from the memory; and
    sending, by the radio transceiver, the generated AoA to a host processor of the device.

2. The method as recited in claim 1, comprising:
    receiving the Bluetooth RF signal using one or more antennas; and
    sampling the received Bluetooth RF signal to produce the digitized samples.

3. The method as recited in claim 1, wherein the set of samples comprises I/Q samples of the Bluetooth RF signal.

4. The method as recited in claim 1, wherein the set of samples corresponds to a portion of the Bluetooth RF signal corresponding to a Bluetooth Low Energy (BLE) advertisement packet.

5. The method as recited in claim 4, wherein the BLE advertisement packet is transmitted by a BLE beacon.

6. The method as recited in claim 5, wherein the BLE beacon is configured to transmit using one or more directional antennas, and wherein the BLE advertisement includes an indication of an angle of departure (AoD) that indicates an orientation of the directional antenna used to transmit the BLE advertisement packet.

7. The method as recited in claim 6, comprising:
    decoding the received BLE advertisement packet;
    extracting the indication of the AoD from the decoded BLE advertisement packet; and
    storing the extracted AoD indication in the memory with the set of samples.

8. An apparatus for wireless communication, the apparatus comprising:
    a host processor connected to a Bluetooth transceiver via an interface;
    a Wi-Fi transceiver;
    a memory shared between the Wi-Fi transceiver and to the Bluetooth transceiver; and
    the Bluetooth transceiver configured to:
        extract a set of samples from digitized samples of a Bluetooth radio frequency (RF) signal;
        store the set of samples in the memory;
        signal the Wi-Fi transceiver to indicate the set of samples is stored in the memory;
    the Wi-Fi transceiver configured to:
        read the set of samples from the memory;
        generate, using the set of samples, an angle of arrival (AoA) of the Bluetooth RF signal;
        store the generated AoA in the memory; and
        signal the Bluetooth transceiver to indicate that the generated AoA is available in the memory,
    wherein the Bluetooth transceiver is further configured to:
        read the generated AoA from the memory; and
        send the generated AoA to the host processor via the interface.

9. The apparatus as recited in claim 8, wherein the set of samples comprises I/Q samples of the Bluetooth RF signal.

10. The apparatus as recited in claim 9, further comprising:
    an array of antennas configured to receive the Bluetooth signal.

11. The apparatus as recited in claim 10, wherein the Bluetooth transceiver is configured to sample the Bluetooth RF signal received at each antenna of the array of antennas, and wherein the set of samples comprises a groups of samples for the Bluetooth RF signal, each group corresponding to the Bluetooth RF signal received at each respective antenna of the array of antennas.

12. The apparatus as recited in claim 8, wherein the set of samples corresponds to a Bluetooth Low Energy (BLE) advertisement packet, and wherein the BLE advertisement packet is transmitted by a BLE beacon.

13. The apparatus as recited in claim 12, wherein the BLE beacon is configured to transmit using one or more directional antennas, and wherein the BLE advertisement includes an indication of an angle of departure (AoD) that indicates an orientation of the directional antenna used to transmit the BLE advertisement packet.

14. The apparatus as recited in claim 13,
the Bluetooth transceiver configured to:
 decode the received BLE advertisement packet;
 extract the indication of the AoD from the decoded BLE advertisement packet;
 store the extracted AoD indication in the memory with the set of samples;
the Wi-Fi transceiver configured to:
 read the extracted AoD indication from the memory; and
 incorporate the extracted AoD indication in the generation of the AoA.

15. A System-on-Chip (SoC) comprising:
a Wi-Fi transceiver;
a memory shared between the Wi-Fi transceiver and to a Bluetooth transceiver;
a host processor that shares an interface with the Bluetooth transceiver; and
the Bluetooth transceiver configured to:
 extract a set of samples from digitized samples of a Bluetooth radio frequency (RF) signal;
 store the set of samples in the memory;
 signal the Wi-Fi transceiver to indicate the set of samples is stored in the memory;
the Wi-Fi transceiver configured to:
 retrieve the set of samples from the memory;
 generate, using the set of samples, an angle of arrival (AoA) of the Bluetooth RF signal;
 store the generated AoA in the memory; and
 signal the Bluetooth transceiver to indicate that the generated AoA is available in the memory,
wherein the Bluetooth transceiver is further configured to:
 read the generated AoA from the memory; and
 send the generated AoA to the host processor via the interface.

16. The SoC as recited in claim 15, further comprising an interface to an array of antennas configured to receive the Bluetooth RF signal, wherein the Bluetooth transceiver is configured to sample the Bluetooth RF signal received at each antenna of the array of antennas, and wherein the set of samples comprises groups of samples for the Bluetooth RF signal, each group corresponding to the Bluetooth RF signal received at each antenna of the array of antennas.

17. The SoC as recited in claim 15, wherein the set of samples corresponds to a Bluetooth Low Energy (BLE) advertisement packet, wherein the BLE advertisement packet is transmitted by a BLE beacon, wherein the BLE advertisement includes an indication of an angle of departure (AoD) that indicates an orientation of a directional antenna used to transmit the BLE advertisement packet, the Bluetooth transceiver configured to:
 decode the received BLE advertisement packet;
 extract the indication of the AoD from the decoded BLE advertisement packet;
 store the extracted AoD indication in the memory with the set of samples;
the Wi-Fi transceiver configured to:
 read the extracted AoD indication from the memory; and
 incorporate the extracted AoD indication in the generation of the AoA.

18. The SoC as recited in claim 15, wherein the SoC is embodied as or part of a baseband processor, media access controller, wireless network interface, access point controller, or wireless communication chipset.

* * * * *